Patented Oct. 19, 1954

2,692,292

UNITED STATES PATENT OFFICE 2,692,292

OXIDATIVE DEHYDROGENATION REACTIONS

Ivan Maxwell Robinson, Wilmington, Del., assignor to E. I. du Pont de Nemours and Company, Wilmington, Del., a corporation of Delaware No Drawing. Application July 10, 1951,
Serial No. 236,085

10 Claims. (Cl. 260—666)

This invention relates to a new process for the preparation of unsaturated compounds and, more particularly, relates to vapor phase oxidative dehydrogenation of cyclic alkanes to cyclic alkenes by a process conducted in the absence of catalysts.

In the past, the oxidation of cyclic paraffins has been chiefly of a catalytic nature and directed toward obtaining oxygenated products. Thus, Loder, U. S. Patent 2,223,493 claims the production of dibasic acids by the catalytic oxidation of alicyclic hydrocarbons. Furthermore, according to Loder, U. S. Patent 2,223,494, cyclic alcohols and ketones are formed by a related catalytic oxidation. Milas and Walsh, J. Am. Chem. Soc., 61, 633 (1939) obtained maleic acid and its anhydride by catalytic oxidation of alicyclic compounds. In general, the prior art indicates that the oxidation of alicyclics as directed or promoted by catalysts has produced materials containing oxygen.

The non-catalytic oxidation of alicyclic hydrocarbons has not been investigated extensively. Lewin (Bull. Soc. Chim. Belg., 42, 141 (1933)) studied a number of alkyl cycloparaffins under reaction temperatures of less than 250° C. He found that the induction period for the oxidation of methylcyclopentane was several hours. Ivanov (C. A. 30, 6344 (1936)) obtained peroxides by the oxidation of cyclohexane with air in a fluid system.

Moreover, it is known that some organic compounds can be thermally cracked either catalytically or non-catalytically to cause dehydrogenation, whereby some olefinic materials are produced. The prior art on thermal cracking of alicyclic hydrocarbons indicates that, in general, a wide variety of products are obtained in various degrees of degradation. Frey, Ind. Eng. Chem., 26, 198 (1934) and Haensel and Ipatieff, Ind. Eng. Chem., 35, 632 (1943) cracked cyclohexane at high temperature to obtain a very small amount of cyclohexene in addition to a large number of other products.

In contrast with the art, the oxidative dehydrogenation process of this invention so controls the conversion of cycloalkanes and the alkyl and aryl substituted cycloalkanes that they are converted in high yield to the corresponding unsaturates.

An object of the present invention is to provide a non-catalytic oxidative dehydrogenation process. Another object is to provide a process for the preparation of unsaturated cyclic alkenes by an oxidative dehydrogenation of cyclic alkanes by a process conducted at high temperatures and in the absence of a catalyst. Yet another object is to provide optimum conditions for the aforesaid reactions. Other objects and advantages of the invention will be hereinafter described.

In view of the prior art on oxidation of alicyclic hydrocarbons, both catalytic and non-catalytic, the results obtained by the process of this invention were surprising and unexpected. By carrying out the oxidation of saturated substituted or unsubstituted cycloalkanes in the absence of catalysts and at a high temperature in the vapor phase, predominantly cyclic alkenes are produced instead of oxygen-containing compounds. Moreover, by conducting the oxidation within a critical temperature range and in the absence of reaction initiators, the course of the reaction is markedly changed to that of oxidative dehydrogenation.

More specifically, the invention is directed to a method of preparing unsaturated compounds by heating in the vapor phase and under temperatures between 380° C. and 700° C., a mixture of an oxidizing gas and a saturated cyclic alkane or a substituted cyclic alkane, there being present from 0.05 to 1 mole of oxygen per mole of the saturated hydrocarbon, the reaction being conducted in the absence of a catalyst. There may be present with the oxygen an inert gas such as nitrogen and, if desired, air may be used as the oxidizing gas providing the ratio of oxygen to the hydrocarbon is within the range indicated.

The process of the invention is carried out by passing, in the vapor phase, the cyclic alkane to be subjected to oxidative dehydrogenation into a suitable reactor heated to a temperature between 380° C. and 700° C., together with oxygen or a gas containing oxygen, such as air, there being present preferably from 0.1 to 0.5 mole of oxygen per mole of the cyclic alkane or substituted cyclic alkane. The mixture of hydrocarbon and oxidizing gas is passed through the reactor at a space velocity between 100 and 50,000. The space velocity used in this specification and in the claims is based on the ratio of the volume of the reactants introduced per hour (calculated as gases at S. T. P.) to the free volume of the reactor at reaction temperatures.

The invention is illustrated in greater detail by the following examples in which parts are by weight unless otherwise indicated.

*Example 1.*—A mixture of air and cyclohexane, having a mole ratio of 2 to 1, was passed at a space velocity of 9200 into a 55 cm. long, 18 mm.

O. D. quartz reaction tube, vertically mounted in a split electrically heated furnace, 21 cm. of the tube being inside the furnace. The products of the reaction were condensed by a series of water ice and Dry Ice cooled receivers into which the product gases passed from the reaction tube. The uncondensed gases were metered and analyzed by means of a mass spectrometer. The contact time of the gases in the reaction zone, which was maintained at a temperature of approximately 460° C., was in the order of from about 0.145 of a second. A 40% yield of cyclohexene with an 8% conversion of cyclohexane was obtained. The cyclohexene was identified by bromination of the product to dibromocyclohexane and subsequent analysis of the brominated compound for bromine content.

Example 2.—Example 1 was substantially duplicated except that better than 95% pure oxygen was used as the oxidizing gas. The oxygen and cyclohexane, with a mole ratio of 1 to 4, were reacted at a space velocity of 1600 and under a temperature of approximately 390° C. Analysis of the product disclosed a 63% yield of cyclohexene with an 8% conversion of cyclohexane.

It was found that diluents, such as nitrogen and ammonia, could be added to the reactant gases without altering the course of the reaction. Their addition, however, necessitated an increase in the temperature for the reaction but had little influence on the yield of cyclohexene.

Example 3.—Under conditions similar to those described in Example 1, a 78% yield of methylcyclopentene at 12% conversion was obtained by air oxidation of methylcyclopentane. The conditions employed for oxidation were: temperature 480° C., air/methylcyclopentane mole ratios 1:1 and a space velocity of 3300.

Example 4.—Cyclopentene was formed in 60% yield at 10% conversion by operating in accord with the process of Example 1, at a temperature of 550° C., an air/cyclopentane mole ratio of 1 to 1 and a space velocity of 3600.

Example 5.—Methylcyclohexene was prepared in a yield of 47.7% and with a conversion of methyl cyclohexane of 16%, by a process such as that described in Example 1. In this reaction the reactants were passed at a space velocity of 1600 through the reactor maintained at a temperature of approximately 450° C. Per mole of oxygen, 3.5 moles of methylcyclohexane were passed into the reactor under the prescribed conditions.

The process of this invention is applicable to the oxidative dehydrogenation of cyclic alkanes and the aryl and alkyl substituted cyclic alkanes generally, such, for example, as cyclohexane, methyl cyclohexane, cyclopentane, methyl cyclopentane, trimethyl cyclopentane, ethyl cyclopentane and phenyl cyclopentane.

As illustrated by the examples, either pure oxygen or oxygen mixed with inert diluents, such as nitrogen, ammonia, carbon dioxide and the like, can be used in the process of this invention. Thus the oxygen may be introduced into the reaction vessel in the form of oxygen-nitrogen mixtures, such as air, or of oxygen-carbon dioxide mixtures. The oxygen, or the gaseous mixture containing it, may be introduced at more than one point in a tubular reactor, if desired, to avoid a large excess of oxygen near the inlet. Reduced or elevated pressure may be used if desired. The compound to be oxidatively dehydrogenated is preferably vaporized, if not normally a gas, and preheated, whether normally a gas or not, before passage into the reactor. The latter may be constructed of any non-metallic, non-catalytic material such, for example, as temperature resisting glass, quartz, or vessels lined with such materials.

I claim:

1. A process for the preparation of unsaturated compounds from cyclic alkanes which comprises heating in the vapor phase, at a temperature between 380° C. and 700° C., a cyclic alkane in the presence of an oxidizing gas containing from 0.05 to 1 mole of oxygen per mole of the cyclic alkane being reacted, the reaction being conducted at a space velocity between 1600 and 50,000 and in the absence of a catalyst.

2. The process of claim 1 wherein the oxygen content of the oxidizing gas employed is from 0.1 to 0.5 mole of oxygen per mole of the cyclic alkane.

3. The process of claim 2 in which the cyclic alkane is cyclohexane.

4. The process of claim 2 in which the cyclic alkane is methylcyclohexane.

5. The process of claim 2 in which the cyclic alkane is cyclopentane.

6. The process of claim 2 in which the cyclic alkane is methyl cyclopentane.

7. The process of claim 1 in which the oxidizing gas is air.

8. A process for the preparation of a compound of the group consisting of alkyl and aryl cyclic alkenes which comprises passing, at a space velocity between 1600 and 50,000, from 0.05 to 1 mole of oxygen per mole of a compound of a group consisting of alkyl and aryl cyclic alkanes into a reaction zone at a temperature between 380° C. and 700° C., in the absence of a catalyst.

9. A process for the preparation of cyclohexene which comprises passing a gaseous mixture of from 0.05 to 1 mole of cyclohexane per mole of oxygen into a reaction zone at a temperature between 380° C. and 700° C. and a space velocity between about 1600 and about 9200 and in the absence of a catalyst.

10. A process for the preparation of cyclohexene which comprises passing a gaseous mixture of from 0.1 to 0.5 mole of cyclohexane per mole of air into a reaction zone at a temperature between 380° C. and 700° C. and at a space velocity between about 1600 and about 9200 and in the absence of a catalyst.

References Cited in the file of this patent

UNITED STATES PATENTS

| Number | Name | Date |
| --- | --- | --- |
| 2,143,380 | Klein | Jan. 10, 1939 |
| 2,376,257 | La Comble | May 15, 1945 |
| 2,416,156 | Cook | Feb. 18, 1947 |
| 2,443,503 | Harris | June 15, 1948 |
| 2,495,332 | Kotzebue | Jan. 24, 1950 |
| 2,533,581 | Harris | Dec. 12, 1950 |